W. H. BROWN.
CALCULATING MACHINE.
APPLICATION FILED JUNE 6, 1910.
1,212,320.
Patented Jan. 16, 1917.
5 SHEETS—SHEET 5.
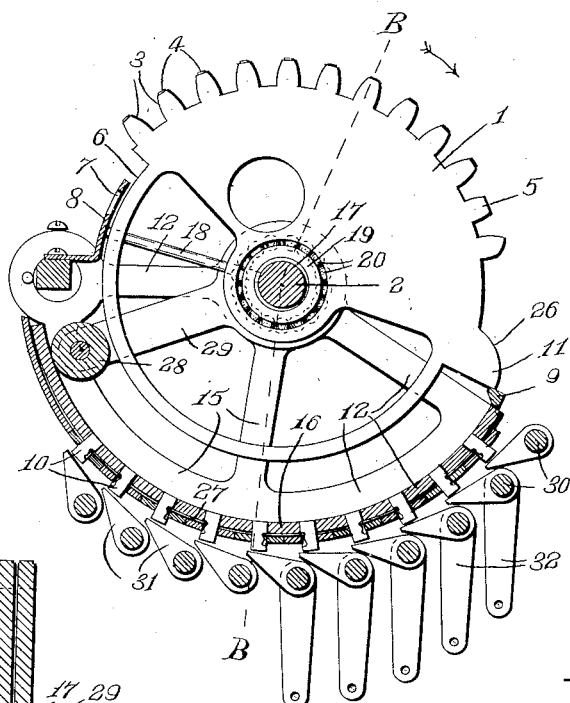
Fig-5-
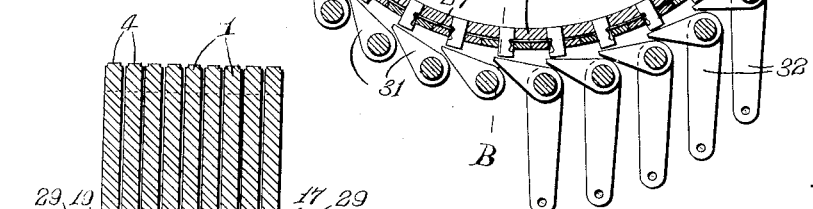
Fig-6-
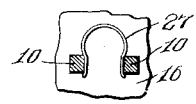
Fig-7-
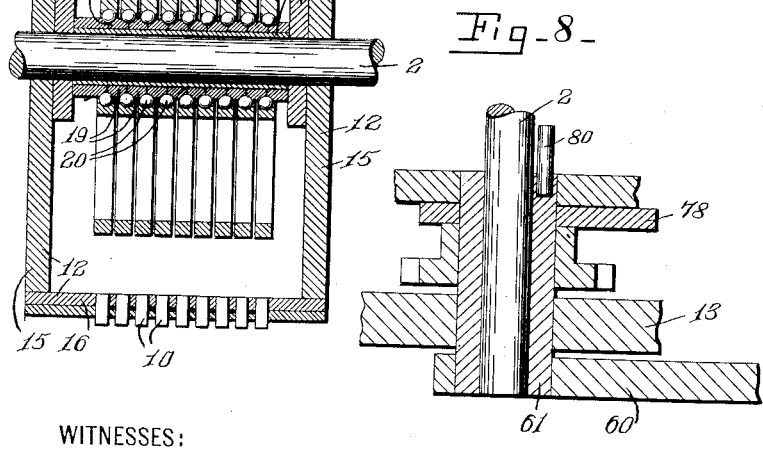
Fig-8-
WITNESSES:
Chas H Young
S. Davis
INVENTOR
William H Brown
BY
Parsons, Hall & Bodell
ATTORNEYS

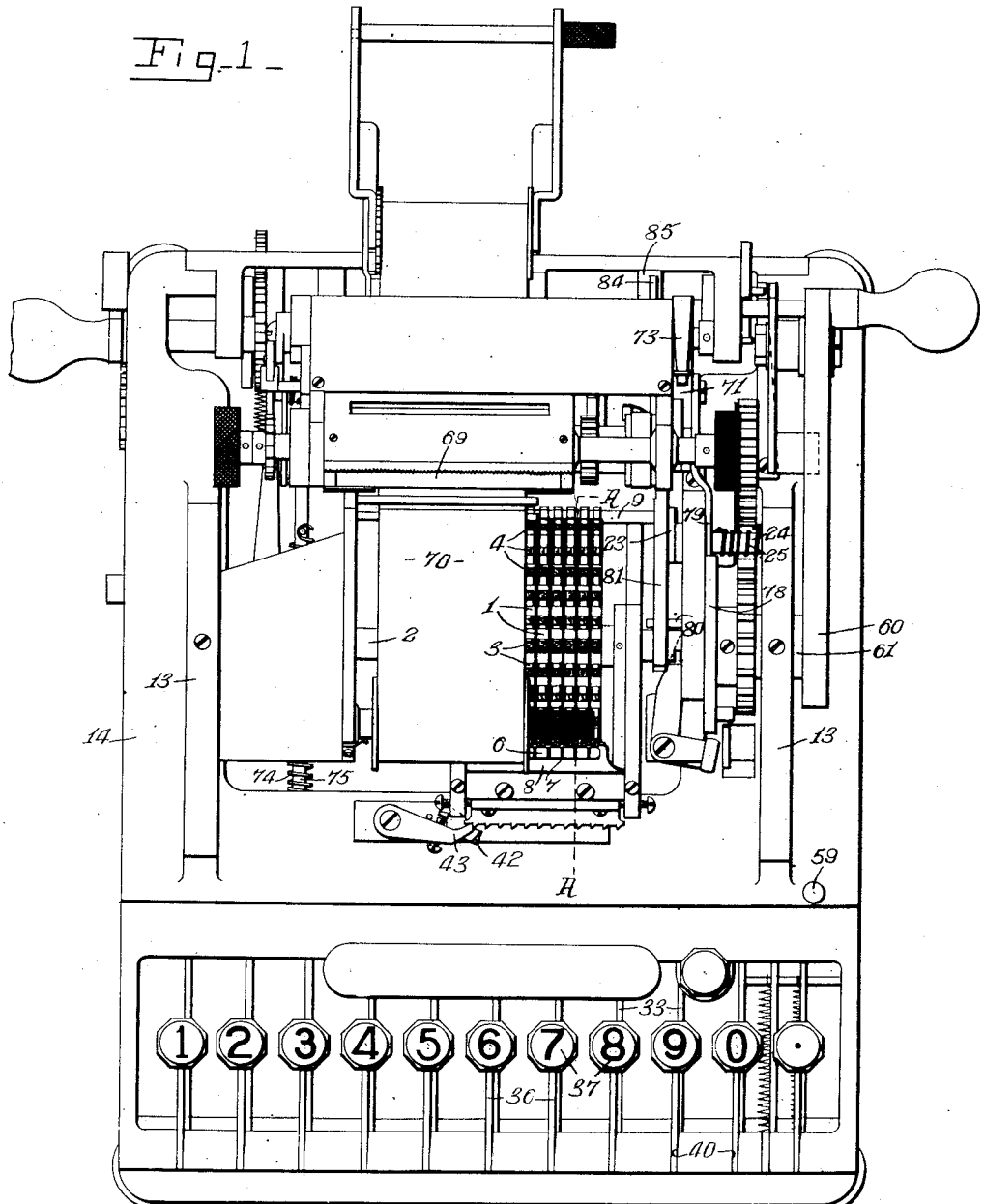

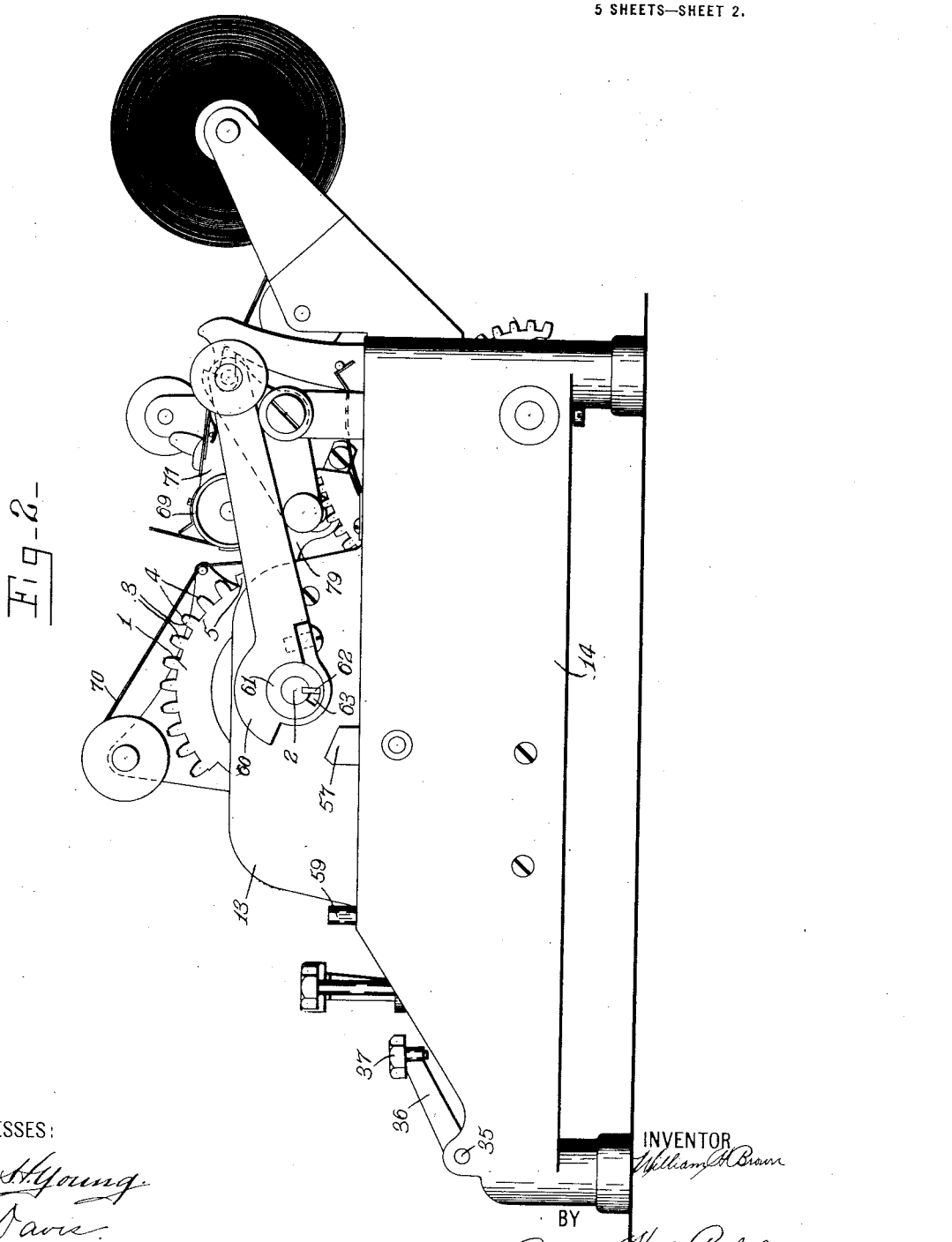

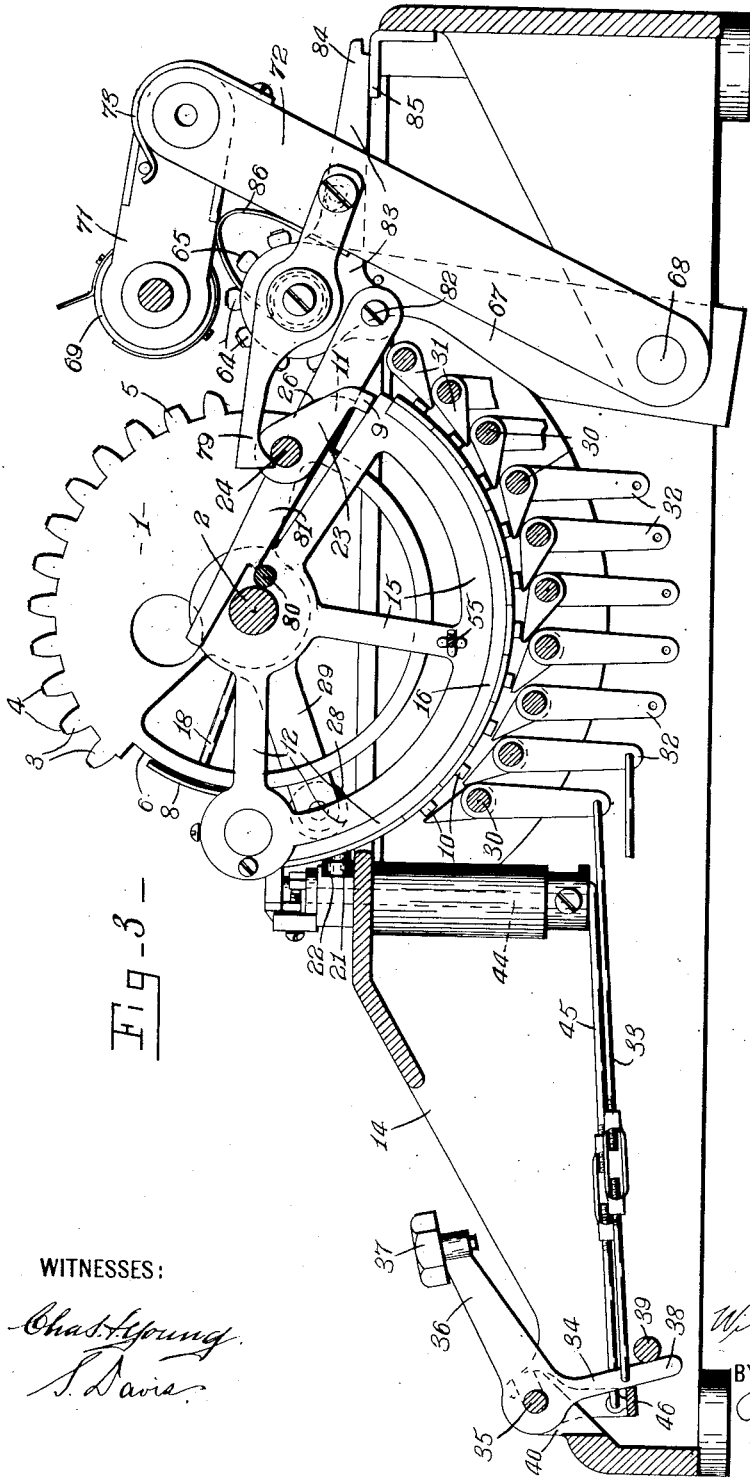

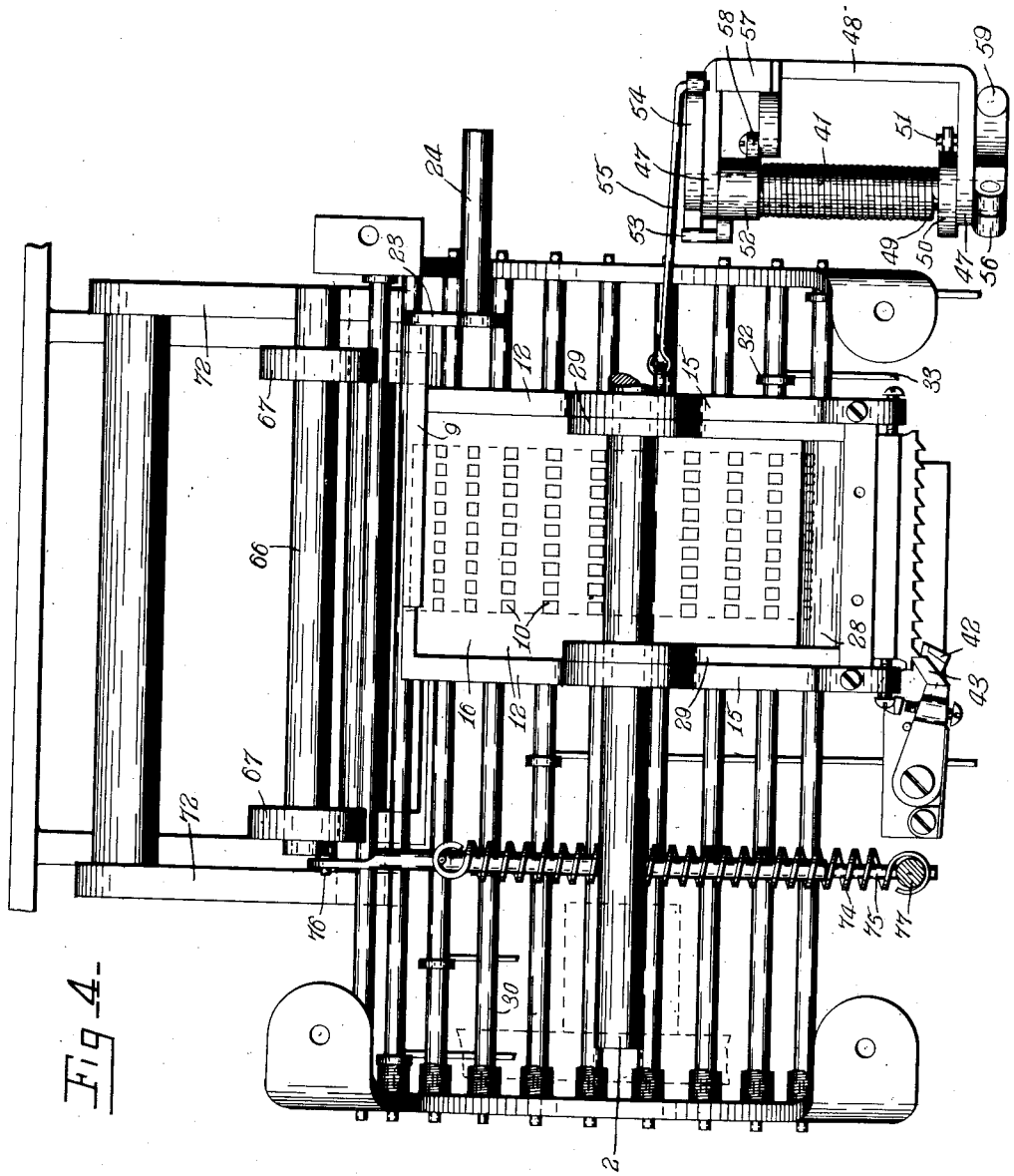

UNITED STATES PATENT OFFICE.

WILLIAM H. BROWN, OF SYRACUSE, NEW YORK, ASSIGNOR TO H. H. FRANKLIN MANUFACTURING COMPANY, OF SYRACUSE, NEW YORK, A CORPORATION OF NEW YORK.

CALCULATING-MACHINE.

1,212,320.  Specification of Letters Patent.  Patented Jan. 16, 1917.

Application filed June 6, 1910. Serial No. 565,197.

*To all whom it may concern:*

Be it known that I, WILLIAM H. BROWN, of Syracuse, in the county of Onondaga and State of New York, have invented a new and useful Calculating-Machine, of which the following is a specification.

My invention has for its object the production of a calculating machine mechanism which is particularly simple in construction and operation, and it consists in the combinations and constructions hereinafter set forth and claimed.

In describing this invention, reference is had to the accompanying drawing in which like characters designate corresponding parts in all the views.

Figure 1 is a plan of a calculating machine comprising a preferable embodiment of my invention. Fig. 2 is a side elevation thereof. Fig. 3 is a longitudinal sectional view of said calculating machine looking to the left, parts being omitted. Fig. 4 is a plan of detached parts of the calculating machine. Fig. 5 is a section on line A—A, Fig. 1, parts being omitted. Fig. 6 is a section on the plane of line B—B, Fig. 5, parts being omitted. Fig. 7 is a fragmentary view of the support for the abutments, illustrating one of the strings for holding the abutments in their operative and inoperative positions. Fig. 8 is a sectional view through the actuating sleeve and contiguous parts.

This calculating machine mechanism includes generally a series of elements in the nature of driving or controlling elements, means for supporting these elements, and means for effecting and determining the movements and positions thereof.

The driving or controlling elements 1 of my present invention are preferably the elements 1 of my Patents, Nos. 1,088,671, February 24, 1914, and 1,122,191, December 22, 1914, these elements 1 as in my prior applications consisting of wheels oscillating about the axis of a horizontal shaft 2 into and out of position to effect the indicating or printing of a record of predetermined numbers, and each wheel having an arc-shaped series of peripheral teeth 3, a number of which are provided with raised printing characters 4 as 0, 1, 2, 3, etc., at their ends, and others of which are unprovided with printing characters, one of the latter teeth 5 being shorter than the teeth 3 and normally arranged at one of the two printing points of my mechanism. These elements or wheels 1 are usually provided with suitable indicating surfaces 6 movable across an aperture 7 in a fixed plate 8 arranged in proximity to the edges of the elements 1 at one side thereof. The wheels 1 are provided with means continuously or permanently connected thereto for actuating the wheels into numerical positions, and usually the wheels are eccentrically weighted, the portions of the elements or wheels 1 provided with gear teeth 3 and 5 being weighted and arranged above the axis of the shaft 2 and the greater part of such weighted portions being located above and at the right hand of the axis thereof, and consequently these weighted portions normally tend to move the elements 1 automatically about the shaft 2 in a direction crosswise of the axis of the shaft 2, as indicated by the arrow Fig. 5. Although the illustrated and described elements are particularly applicable for use with the remaining parts of my calculating machine, it will be understood by those skilled in the art that any other suitable elements 1 may be used in lieu of those shown and described.

The controlling elements or wheels 1 are movable individually from their normal or starting positions, that is the position occupied by the wheel 1, Fig. 5, into numerical positions and are movable axially simultaneously step by step into position to coact with toothed means, as calculating elements, to be hereinafter described. Preferably the elements or wheels 1 are prevented from movement about their axis by any suitable means as a rod 9, Figs. 1, 4 and 5, extending parallel to the axis of said elements or wheels, and are releasable from said rod by their axial movement, and when released move about their axis to their numerical positions by their weighted portions into engagement with suitable abutments 10 for determining such numerical positions. The elements 1 are provided with suitable means, as peripheral shoulders 11 located at the lower ends of the series of gear teeth 3 for coacting with the rod 9 and the abutments 10, and these shoulders 11 are carried off the end of the rod during the axial movement of the elements 1.

In the illustrated construction of my invention the elements or wheels 1 are mounted on a carriage 12 movable in reverse directions along the axis of the elements or wheels 1. This carriage preferably comprises the shaft 2 and a supporting member for the abutments 10 mounted on said shaft, the shaft extending in the direction of movement of the carriage and being movable axially and being guided at its ends in suitable bearings provided in uprights 13 on the frame 14 of the calculating machine; and the supporting member for the abutments comprises sides 15 and an intermediate portion 16, the sides 15, Figs. 5 and 6, being located at opposite ends of the series of elements or wheels 1, and having at their upper ends hubs, which are loosely mounted on the shaft 2, and the intermediate portion 16 connecting the outer or lower ends of the sides 15, and preferably having its inner face substantially concentric with the axis of the shaft 2 and opposed to the peripheries of the wheels 1 and formed with a plurality of series of guides for the abutments, the guides being arranged radially with the axis of the shaft 2. The portion of the shaft 2 between the hubs of the sides 15 of the supporting member for the abutments, is usually encircled by a sleeve 17, Figs. 5 and 6, which is provided with arms 18 engaging the sides 15 for holding the sleeve from revolution with the shaft 2. Suitable antifriction bearings, Fig. 5, are provided between the periphery of the sleeve and the elements 1, these bearings comprising collars 19 mounted on and fixed to the sleeve 17, and formed with peripheral ball races, ball races formed in the inner faces around the central openings of the elements 1, and balls 20 in the races. The supporting member for the abutments 10 is prevented from movement about the shaft 2 by suitable means connecting it to the frame, as a roller 21 fixed thereto and movable in a guideway 22 provided on the frame 14 of the calculating machine. The carriage 12 moves step by step in one direction as toward the left for shifting the elements or wheels 1 into denominational positions, and returns in the reverse direction with a single or continuous movement to its initial position.

The means or rod 9 for holding the controlling elements or wheels 1 from movement about their axis is common to all of said elements or wheels and normally engages the shoulders 11 of said elements, and is fixed from movement with the carriage 12. As the carriage moves step by step to the left, the elements 1 are successively moved beyond the end of said rod 9 and released one by one from the end of this rod 9, and are then free to move about their axis into numerical positions, that is into engagement with the abutments 10. The rod 9 may be fixed upon any suitable support, but is here illustrated, Figs. 1 and 4, as mounted upon the free end of a depending arm 23 provided on one end of a spindle 24 journaled in the frame 14 and connected to a spring 25, Fig. 1, which tends to hold the rod in its normal position. By supporting the rod 9, as described, cam faces 26 provided upon the shoulders 11, serve to engage and force the rod 9 out of the path of said shoulders whenever one of the elements, after it has been released from the end of the rod, has been moved axially to the right before the same is moved about its axis to its normal or starting position. The described means for supporting the rod 9 may, however, be dispensed with and any suitable means substituted therefor.

In the illustrated embodiment of my invention the abutments 10 preferably consist of a plurality of pins or pegs, Fig. 5, movable in the radial guides of the supporting member 16 of the carriage 12 and arranged in series of ten, one series for each element 1, and as the abutments are located in a rigid support they are fixed from movement relatively to each other. Said abutments are preferably arranged in an arc concentric with the axis of the elements 1, are substantially radial to said axis, and are normally arranged with their upper ends flush with the upper face of the support 16 and out of the paths of movement of the shoulders 11 of the elements 1, and are movable beyond said face into operative position into said paths of movement. The abutments may be held in their normal and operative positions by any suitable yielding means, as springs 27 having a plurality of arms, each spring being preferably formed U-shape, Fig. 7, and arranged between a pair of the abutments with the arms thereof coacting with notches in opposing faces of said abutments. These springs may be held in position in any suitable manner, they being here shown, Fig. 5, as interposed between inner and outer layers constituting the intermediate portion of the abutment supporting member 16, one of these layers as the upper, Figs. 3, 4 and 5, being one piece and the other or lower layer being composed of a plurality of sections extending parallel to the axis of the shaft 2, thus facilitating the manufacture of the supporting member and permitting access to the abutments and their retaining springs.

The abutments 10 are forced from their operative positions and the controlling elements or wheels 1 are returned to their starting positions by means movable with the shaft and about the axis of the controlling elements 1, said means usually comprising a roller 28, Figs. 3, 4 and 5, preferably mounted between the free ends of radial arms 29 fixed to said shaft, said means or roller 28 also engaging the shoulders 11 and returning the elements 1 from numerical positions to their starting positions.

The abutments are moved into their operative positions by suitable means comprising a plurality of rock shafts 30, Figs. 3, 4 and 5, corresponding in number to the number of abutments 10 in each series and arranged beneath the intermediate portion of the abutment supporting member 16 of the carriage 12 substantially parallel with the axis of the shaft 2, and in an arc substantially concentric with said axis. Each shaft 30 is provided with a laterally extending arm 31 for detachably engaging the lower end of the abutment 10 above said arm and with a depending arm 32. These depending arms 32 are connected to the rear ends of longitudinally adjustable links 33 having their front ends connected to actuating key levers 34, Fig. 3, loosely mounted intermediate of their ends upon a shaft 35. The key levers are provided with upwardly extending arms 36 supporting key heads 37 and depending arms 38 pivoted to the front ends of the links 33 and normally engaging a stop 39. The key levers are arranged in a single series and represent numerical values of from 0–9 inclusive.

The key levers 34 are preferably arranged in slots 40, Figs. 1 and 3, in a transversely extending portion of the frame, the walls of these slots engaging opposite sides of the key levers and guiding the same in their movement on the shaft or rod 35.

The carriage is moved toward the left for moving the elements 1 into denominational positions by a suitable spring 41, Fig. 4, and is controlled in such movement so as to advance step by step, by an escapement of any desirable form, size and construction, and as here illustrated comprising fixed and movable pawls 42, 43 operated by a vertical shaft 44 which is journaled in a post depending from the top plate of the frame 14, and is connected by a link 45 to a universal bar 46 movable by each of the key levers 34. As the escapement and the means for operating the same form no part of my present invention, it is thought that further description thereof is unnecessary. The spring 41 is preferably connected to the carriage 12 so that the spring may act to move the carriage to the left and be acted on and tensioned independently of the carriage, and the carriage moved to the right independently of the spring. In the illustrated construction of my invention said spring 41 is a coiled wire torsion spring and is arranged between parallel arms 47 of a frame member 48 and encircles a shaft 49 journaled at its ends in the arms 47. One end of the spring is fixed to a head 50 having an arm coacting with a pin 51 projecting from the inner face of one of the frame arms 47, and the other end of the spring is fixed to a rocking head 52 or driving member, and moves in reverse directions therewith, the rocking head 52 having an arm 53 which detachably engages one end of a lever or driven member 54 fixed to the contiguous end of the shaft 49 and which may also be moved into and out of engagement with the contiguous arm 47 of the frame member 48. A link 55 connects the lever 54 directly to the carriage 12. The opposite end of the shaft 49 is provided with an arm 56 fixed thereto.

The spring 41 is preferably tensioned by a plunger 57 guided in the frame and having a lateral arm pivotally connected at 58 to the rocking head 52. The shaft 49 is moved in a direction opposite to the movement thereof effected by the spring 41, by any suitable means, as a plunger 59, guided in the frame 14 and pivotally connected to the arm 56. The plungers 57 and 59 are arranged one in advance of the other lengthwise of the frame 14 in the path of an operating member 60 connected to the shaft 2 and movable therewith about the axis thereof, the plunger 57 being engaged by the member 60 before the plunger 59. This member 60 although connected to the shaft 2 is not mounted directly on said shaft in the preferable construction of my invention, but is mounted directly on a sleeve 61 encircling the shaft 2 and connected to the shaft 2 by a lost motion, the shaft being provided with a key 62 which works in a keyway 63 in the sleeve of greater width than the key. The connection of the sleeve and shaft 2 is desirable to permit axial movement of the shaft.

Upon the operation of the escapement controlling the movement of the carriage to the left, this operation being effected by the depression of any one of the key levers 34, the spring 41 expands and through the rocking head 52, the lever 54 and the link 55, moves the carriage to the left. Upon the depression of the plunger 57 the spring is compressed and the arm 53 of the rocking head 52 is moved out of engagement with the coacting portion of the lever 54, consequently when the plunger 59 is actuated the shaft 49, the arm 53 and the link 55 serve to retract the carriage to the right independently of the spring, and at the end of such return movement of the carriage the lever 54 again engages the arm 53 of the rocking head 52 whereupon the carriage-moving means is in its position assumed in order that the action of the spring 41 may effect the advance movement of the carriage.

The controlling or driving elements or wheels 1 as they shift laterally into denominational positions move into position to coact with toothed means, as the calculating wheels or driven elements 64 having gear teeth for meshing with the gear teeth 3 and 5 of the controlling elements or wheels, the teeth of the calculating wheels 64 having printing characters or type 65 at their ends. The calculating wheels 64 are movable toward and from the controlling wheels into and out of mesh with the same, and are mounted upon a shaft 66 supported by a suitable carriage, this carriage consisting of arms 67 pivoted at 68 to the frame and carrying at their upper ends, the shaft 66. A suitable platen 69, or other means for supporting a record-receiving sheet is located above the calculating wheels 64 and in rear of the controlling wheels 1, and said platen is movable with the calculating wheels in order to receive an impression from the type of the controlling wheels at the printing point during each operation of the machine, and said platen 69 is movable at will toward and from the printing line of the calculating wheels for receiving the total from the calculating wheels. An inking ribbon 70 supported and fed in any suitable manner extends between the platen and the controlling and calculating wheels. As here shown, the platen 69 is carried at the free ends of forwardly extending arms or levers 71 which are pivoted at their rear ends to the upper ends of arms 72 which are in turn pivoted upon the same pivot 68 that the arms 67 are mounted. The arms 71 are normally held from pivotal movement by a spring 73, Fig. 3. The platen may be moved toward the printing line of the calculating wheels by striking it with the hand, or may be operated as disclosed in my pending application Sr. No. 474,931, filed January 29th, 1909.

The movement of the calculating wheel carriage forwardly is effected by means of a spring 74 connected at one end thereto and at its other end to the front part of the frame. This spring 74, Figs. 1 and 4, is here shown as coiled around a rod 75 pivoted directly at 76 to the calculating wheel carriage, and having its front end guided in a lug 77 depending from the top plate of the frame 14. The calculating wheel carriage is held in its rear or normal position against action by the spring 74 by means of a radial arm 78, Figs. 1 and 8, provided on the sleeve 61 and coöperating with an arm 79, Figs. 1 and 3, connected to one of the arms 67 of the calculating wheel carriage and one of the arms 72 of the platen carriage. As the sleeve is rotated by means of the handle or operating member 60, the radial arm 78 is moved out of engagement with the arm 79 so that the calculating wheel carriage is free to be moved forwardly on its pivot 68 by the spring 74, bringing the calculating wheels 64 in mesh with the controlling wheels 1, and also bringing the platen 69 and paper thereon toward and from the type of the controlling wheels at the printing line of the controlling wheels. The calculating wheel and platen carriages are returned to their normal positions against the action of the spring 74 by a shoulder 80, Figs. 1 and 3, provided on the sleeve 61 and coöperating with a push arm 81 connected at its rear end to the calculating wheel carriage. As here shown, the rear end of the push arm 81 is pivoted at 82 to an angle lever 83 pivoted to one of the arms 67 constituting the calculating wheel carriage, and having a rearwardly extending stop arm 84 which, when the carriage is in its forward position, that is, when the calculating wheels 64 are in mesh with the controlling wheels 1, engages a fixed shoulder 85 on the frame 14 and holds the calculating wheels firmly in mesh with the controlling wheels. The rearward movement of the push arm 81 serves to move the angle lever 83 about its axis, carrying the stop arm 84 out of engagement with the shoulder 85, permitting the carriage to be returned to its rear position. The relative position of the arms 78 and 80 of the sleeve 61 is such that the calculating wheel carriage 67 and platen 69 are brought forward at the initial part of the movement of the operating lever 60 and the calculating wheel carriage returned to its rear position at the end of the movement of such operating member 60. Yielding means, as a spring 86, is interposed between the arms 67 of the calculating wheel carriage and the arms 72 of the platen carriage, for permitting the platen 69 to engage the type of the controlling wheels just prior to the engagement of the calculating wheels 64 and the controlling wheels, and to rebound away from the printing line when said controlling and calculating wheels are in mesh and are rotating.

The construction and operation of the calculating wheel carriage and the platen carriage forms no part of this application, but constitutes the subject-matter of my Patent No. 1,167,332, Jan. 4, 1916.

Assuming that it is desired to add the numbers 134 and 653, the operation is as follows: The key heads 37 bearing the numbers 1, 3 and 4 are struck in order, positioning the proper abutments 10 of the first three series of abutments from the left, and permitting the controlling wheel carriage to feed step by step three steps to the left, releasing the first three elements or wheels 1 consecutively from the rod 9 and permitting them to be actuated about their axis by their weighted portions until limited by said abutments. When so limited the type for the numbers 1, 3 and 4 are at the printing line of the wheels 1. The operating lever 60 is then oscillated causing (1) the calculating wheels to be brought in mesh with the previously set controlling wheels and the paper on the platen 69 brought into and out of contact with the type 1, 3, and 4 at the printing line of the wheels 1, (2) returning the positioned abutments and said controlling wheels to their starting position by means of the roller 28, and thus actuating the calculating wheels in mesh therewith, and (3) returning the controlling wheels to the right to their normal position and the calculating wheels 64 rearwardly. The key heads 37 bearing numbers 6, 5, 3 are then depressed in order and the operating member 60 oscillated as before. To receive the printed total the platen 69 is forced downwardly toward the calculating wheels 64.

My calculating machine is also provided with novel decimal mechanism forming the subject matter of my Patent No. 1,160,372, Nov. 16, 1915, and carrying over and clearing mechanism, forming the subject matter of my pending application Sr. No. 592,227, filed Nov. 14, 1910.

What I claim is:—

1. In combination, in a recording machine, a movable element having gear teeth for engaging a toothed element, the teeth being normally disengaged from the toothed element and provided with type at their ends, said movable element being arranged to advance by gravity, and means for retaining the movable element in its starting position and for releasing said element, substantially as and for the purpose set forth.

2. In combination, in a recording machine, a wheel oscillating about a substantially horizontal axis and having a series of peripheral gear teeth for engaging a toothed element, the teeth being normally disengaged from the toothed element and provided with type at their ends, the wheel having a weighted portion arranged above and at one side of its axis and overbalancing the opposite portion of the wheel and thereby tending to advance the wheel by gravity, and means for retaining the wheel in its starting position and for releasing said wheel, substantially as and for the purpose described.

3. In combination, in a recording machine, a movable element having gear teeth for engaging a toothed element, the teeth being normally disengaged from the toothed element, a number of the teeth being provided with type at their ends, and another of the teeth being in advance of said number of teeth and being unprovided with type, the movable element being normally arranged with its tooth unprovided with type at the printing line, means tending to advance said element, and means for retaining the movable element in its starting position for releasing said element, substantially as and for the purpose specified.

4. In combination, in a recording machine, a substantially horizontal shaft, a wheel loosely mounted on the shaft and having an upper portion weighted and provided with a series of peripheral gear teeth for engaging a toothed element, a number of teeth being provided with printing characters at their ends, and another of the teeth being below said number of teeth and unprovided with a printing character, the weighted part being above and at one side of the axis of the shaft, and means for retaining the wheel in its starting position for releasing the wheel, substantially as and for the purpose set forth.

5. In a calculating machine, a series of elements shiftable laterally into denominational positions, the elements being movable individually in a direction at an angle to the shifting movement thereof into numerical positions, each element having means tending to actuate the same into numerical positions, means for normally holding the elements from movement by its actuating means, and means for controlling the shifting of said elements laterally and the releasing of said elements one by one, from holding means, substantially as and for the purpose described.

6. In a calculating machine, a series of elements shiftable laterally into denominational positions, the elements being movable individually in a direction at an angle to the shifting movement thereof into numerical positions, each element having mea. tending to actuate the same into numerical positions and each element being provided with a shoulder, means common to all the elements for engaging the shoulders of all of said elements, and holding said elements from movement, and means for controlling the shifting of the elements laterally and the releasing of the shoulders from the holding means, substantially as and for the purpose specified.

7. In a calculating machine, a rock shaft, a series of elements loosely mounted concentric with the shaft, the elements being movable about the axis of the shaft from starting positions into numerical positions and having means tending to actuate the same into numerical positions, means for normally holding the elements from movement, means for controlling the releasing of the elements from the holding means, means movable with the shaft and coacting with the elements to return them to their starting positions, and means for actuating the shaft and causing the former means to move the released elements in a retrograde direction from their numerical positions to their starting positions, substantially as and for the purpose set forth.

8. In a calculating machine, a series of elements shiftable laterally into denominational positions, the elements being movable in a direction at an angle to the shifting movement thereof into numerical positions, each element having means tending to actuate it into numerical positions, means for normally holding the elements from movement by their actuating means, means for controlling the shifting of the elements laterally and the releasing of the elements from holding means, and means for returning the released elements from their numerical positions to their starting positions, substantially as and for the purpose described.

9. In a calculating machine, a shaft, a series of elements loosely mounted concentric with the shaft and shiftable lengthwise of the axis of the shaft into denominational positions, the elements being movable individually about the axis of the shaft from starting positions into numerical positions, each element having means associated therewith for actuating the same into said numerical positions, means for normally holding the elements from movement by said actuating means, such elements being releasable one by one from the holding means as the series of elements shifts lengthwise of the axis of the shaft, means for controlling the shifting of the series of elements and the releasing of the elements from the holding means, a connection between the shaft and said elements, the connection being movable with the shaft, and means for actuating the shaft and thereby moving the released elements in a retrograde direction from their numerical positions to said starting positions, substantially as and for the purpose specified.

10. In a calculating machine, a rock shaft, a series of elements loosely mounted concentric with the rock shaft and shiftable lengthwise of the axis of said shaft into denominational positions, the elements being movable individually about the axis of said shaft from starting positions into numerical positions, each element having a weight associated therewith for actuating the same into said numerical positions and each element also having a shoulder, means common to all of the elements for normally engaging the shoulders of all of the elements and holding said elements from movement by the weights, the shifting movement of the elements serving to release the shoulders of said elements from the holding means, means for controlling the shifting of the elements and the releasing of the elements from the holding means, an arm mounted on and movable with the rock shaft and having a part extending parallel to the rock shaft into the paths of movement of said shoulders, and means for actuating the rock shaft and thereby causing said part of the arm to engage the shoulders of the released elements and move said released elements in a retrograde direction from their numerical positions to said starting positions, substantially as and for the purpose set forth.

11. In a calculating machine, a series of wheels movable individually about a substantially horizontal axis into numerical positions, each wheel having a weight associated therewith tending to move the wheel automatically into numerical positions, a rod extending substantially parallel to the axis of the wheels and coacting therewith to hold the wheels from movement by their actuating means, and means for shifting the wheels axially one by one, off the end of the rod thereby releasing said wheels from the rod, substantially as and for the purpose described.

12. In a calculating machine, a series of wheels movable individually about a substantially horizontal axis into numerical positions, each having a series of peripheral gear teeth provided with printing characters at their ends, and each wheel also having a peripheral shoulder at the lower end of its series of gear teeth, each wheel being weighted eccentrically and the weighted part tending to move the wheel automatically into said numerical positions, means coacting with the peripheral shoulders of the wheels for holding said wheels from movement by said weighted parts, means for shifting the wheels axially one by one beyond the end of the holding means and releasing said wheels from said means, and means for coacting with said gear teeth, substantially as and for the purpose specified.

13. In a calculating machine, driving and driven printing elements normally out of position to coöperate with each other, and having relative movement into such position, the driving printing elements being movable into numerical positions, means for holding the driving elements from movement into numerical positions, means for effecting the releasing of the driving elements from the holding means, and means for supporting a record receiving element in position to receive impressions from both printing elements, substantially as and for the purpose set forth.

14. In a calculating machine, driving and driven toothed elements for meshing with each other, the teeth of said elements being provided with type, and means for supporting the record receiving element for receiving impressions from the type of both of said toothed elements, substantially as and for the purpose described.

15. In a calculating machine, driving and driven toothed elements for meshing with each other, teeth of said elements being provided with printing characters, the driving elements tending to move into numerical positions, means for holding the driving elements from movement into numerical positions, means for effecting the release of the driving elements from the holding means, and means for supporting a record-receiving element in position to receive impressions from the printing characters of both of said toothed elements, substantially as and for the purpose specified.

16. In a calculating machine, a series of elements shiftable laterally into denominational positions, a plurality of series of abutments movable independently of each other into operative position, one series of abutments for each element, each of said elements being movable in a direction at an angle to the shifting movement thereof into engagement with one of the abutments to assume a numerical position, means for normally holding the elements from movement toward their numerical positions, such elements being releasable from the holding means, and means for controlling the shifting of the elements laterally and the releasing of said elements from the holding means, substantially as and for the purpose set forth.

17. In a calculating machine, a series of elements each having a shoulder, the elements being shiftable laterally simultaneously step by step into denominational positions, a plurality of series of abutments movable independently of each other into operative position, one series of abutments for each element, each of said elements being movable in a direction at an angle to the shifting movement thereof to engage its shoulder with one of the abutments and thereby assume a numerical position, means common to all of said elements for normally engaging said shoulders and holding the elements from movement toward their numerical positions, the shifting movement of the elements serving to release successively the shoulders of said elements from the holding means, and means for controlling the shifting of the elements laterally, substantially as and for the purpose described.

18. In a calculating machine, a series of elements each having a shoulder, a plurality of series of abutments movable independently of each other into operative position, one series of abutments for each element, each of said elements being movable to engage its shoulder with one of the abutments and thereby assume a numerical position, means common to all of said elements for normally engaging said shoulders and holding the elements from movement toward their numerical positions, said elements being releasable from the holding means, and means coacting with said shoulders for moving the released elements in a retrograde direction from their numerical positions, substantially as and for the purpose specified.

19. In a calculating machine, a series of wheels, each having a series of printing characters and a shoulder, the wheels being shiftable axially simultaneously step by step into denominational positions, a plurality of series of abutments movable independently of each other into operative position, one series of abutments for each wheel, each of said wheels being movable about its axis to engage its shoulder with one of the abutments and thereby assume a numerical position, a rod common to all of said wheels and extending substantially parallel to the axis of the wheels and normally engaging said shoulders for holding the wheels from movement toward their numerical positions, the shifting movement of the wheels serving to release successively the shoulders of said wheels from the end of the rod, and means for controlling the shifting of the wheels axially, substantially as and for the purpose set forth.

20. In a calculating machine, a series of elements, a plurality of series of abutments movable independently of each other into operative position, one series of abutments for each element, each of said elements being movable to coöperate with one of the abutments and thereby assume a numerical position, means for forcing the abutments from their operative position during the return of said elements from out of engagement with the abutments to their starting position, substantially as and for the purpose described.

21. In a calculating machine, a rock shaft, a series of elements loosely mounted concentric with the rock shaft, a plurality of series of abutments movable independently of each other into operative position, one series of abutments for each element, each series of the abutments being disposed in an arc substantially concentric with said shaft, and each of said elements being movable about the axis of the rock shaft to coöperate with one of the abutments and thereby assume a numerical position, and means for forcing the abutments from their operative position, said means comprising an arm mounted on the rock shaft, and a part carried by the arm and movable into engagement with the abutments, substantially as and for the purpose specified.

22. In a calculating machine, a series of elements, a plurality of series of abutments movable independently of each other into operative position, one series of abutments for each element, each of said elements being movable to coöperate with one of the abutments and thereby assume a numerical position, movable means for forcing the abutments from their operative positions, said means also serving to return the elements from their numerical positions, and means for actuating said movable means, substantially as and for the purpose set forth.

23. In a calculating machine, a series of elements each having a shoulder, a plurality of series of abutments movable independently of each other into operative position, one series of abutments for each element, each of said elements being movable to engage its shoulder with one of the abutments and thereby assume a numerical position, and movable means for forcing the abutments from their operative positions and for engaging the shoulders of the elements and returning said elements from their numerical positions, substantially as and for the purpose described.

24. In a calculating machine, a series of elements, a plurality of series of abutments movable independently of each other into operative position, one series of abutments for each element, each of said elements being movable to coöperate with one of the abutments and thereby assume a numerical position, and means for forcing the abutments from their operative positions and for returning the elements from their numerical positions, said means comprising a rock arm and a roller carried by the rock arm and movable into engagement with the abutments and the elements, substantially as and for the purpose specified.

25. In a calculating machine, a series of elements each having a shoulder, a plurality of series of abutments movable independently of each other into operative position, one series of abutments for each element, each of said elements being movable to engage its shoulder with one of the abutments and thereby assume a numerical position, means common to all of the elements for normally engaging said shoulders and holding the elements from movement toward their numerical positions, such elements being releasable from the holding means, means for effecting the release of the elements from the holding means, and means for forcing the abutments from their operative positions and for coacting with said shoulders to return the elements from their numerical positions, substantially as and for the purpose set forth.

26. In a calculating machine, a shaft, a series of elements loosely mounted concentric with the shaft and movable into numerical positions, a support carried by the shaft, means for holding the support from turning about the axis of the shaft, and a plurality of series of abutments carried by the support and movable independently of each other into position to determine the numerical positions of said elements, substantially as and for the purpose described.

27. In a calculating machine, a shaft, a series of elements loosely mounted concentric with the shaft and movable into numerical positions, a support connected to the shaft and having a face opposed to the peripheries of the elements and substantially concentric with said shaft, means for holding the support from turning about the axis of the shaft, and a plurality of series of abutments carried by the support and movable independently of each other into position to determine the numerical positions of said elements, substantially as and for the purpose specified.

28. In a calculating machine, a series of elements movable into numerical positions, a support opposed to the elements, said support consisting of layers arranged contiguous to each other, a plurality of series of abutments carried by the support and movable independently of each other into position to determine the numerical positions of said elements, and means located between the layers of the support for holding the abutments in position, substantially as and for the purpose set forth.

29. In a calculating machine, a series of elements having a common axis and movable about the axis into numerical positions, a support opposed to the peripheries of the elements and comprising inner and outer layers arranged contiguous to each other, having faces thereof substantially concentric with the axis of the elements, one of the layers consisting of a plurality of sections substantially parallel to said axis, the support having a plurality of guides extending through both layers thereof, a plurality of series of abutments movable in the guides independently of each other into position to determine the numerical positions of said elements, and means located between the layers of the support for holding the abutments in their operative position, substantially as and for the purpose described.

30. In a calculating machine, a series of elements movable about an axis into numerical positions, a plurality of series of abutments movable independently of each other into position to determine the numerical positions of said elements, each series of abutments being arranged in an arc substantially concentric with said axis, and means for actuating the abutments comprising a plurality of rock shafts, one for each series of abutments, the rock shafts being arranged in an arc substantially concentric with said axis and the rock shafts being provided with means arranged in position to engage all the abutments of any one series, substantially as and for the purpose specified.

31. In a calculating machine, a series of elements movable about an axis into numerical positions, a plurality of series of abutments movable independently of each other into position to determine the numerical positions of said elements, each series of abutments being arranged in an arc substantially concentric with said axis, and means for actuating the abutments comprising a plurality of rock shafts arranged in an arc substantially concentric with said axis there being one rock shaft for each abutment of one series, and arms mounted on the rock shafts and movable therewith, said arms being movable into separable engagement with the abutments to actuate the same into their inoperative position, substantially as and for the purpose set forth.

32. In a calculating machine, a carriage movable in reverse directions, a series of elements mounted on the carriage and movable into numerical positions, and a plurality of series of abutments supported by the carriage and movable independently of each other into position to determine the numerical positions of said elements, substantially as and for the purpose described.

33. In a calculating machine, a carriage movable in reverse directions, a series of elements mounted on the carriage and movable about a common axis extending in the direction of movement of the carriage, the elements being movable axially into denominational positions, a plurality of series of abutments supported by the carriage and movable independently of each other, one series of abutments for each element, each series of the abutments being disposed in an arc substantially concentric with said axis, and each of said elements being movable about such axis to coöperate with one of the abutments and thereby assume a numerical position, means fixed from movement with the carriage for normally holding the elements from movement about said axis, and means for shifting the carriage in the direction of said axis and releasing the elements successively from the holding means, substantially as and for the purpose specified.

34. In a calculating machine, a carriage movable in reverse directions, a series of elements mounted on the carriage and movable about a common axis extending in the direction of movement of the carriage, the elements being movably axially into denominational positions, a plurality of series of abutments supported by the carriage and movable independently of each other, one series of abutments for each element, each series of the abutments being disposed in an arc substantially concentric with said axis, and each of said elements being movable about such axis to coöperate with one of the abutments and thereby assume a numerical position, means fixed from movement with the carriage for normally holding the elements from movement about said axis, means for shifting the carriage in the direction of said axis and releasing the elements successively from the holding means, means for moving the abutments into operative position, and means movable about said axis for forcing the abutments out of position to coöperate with the elements and for returning said elements from their numerical positions, substantially as and for the purpose set forth.

35. In a calculating machine, a carriage movable in reverse directions and comprising a shaft extending in the direction of movement of the carriage and a supporting member depending from the shaft, and being fixed from rotatable movement with the shaft, a series of elements concentric with the shaft and movable into numerical positions, and means carried by the supporting member for determining the numerical positions of said elements, substantially as and for the purpose described.

36. In a calculating machine, a carriage movable in reverse directions and comprising a shaft extending in the direction of movement of the carriage and a supporting member loosely mounted on the shaft and fixed from rotatable movement with the shaft, said shaft being movable about its axis relatively to the supporting member, a series of elements concentric with the shaft and movable into numerical positions, and means carried by the supporting member for determining the numerical positions of said elements, substantially as and for the purpose specified.

37. In a calculating machine, a frame, a carriage movable in reverse directions and comprising an axially movable shaft extending in the direction of movement of the carriage, elements movable about the shaft independently of the shaft in one direction, a connection between the shaft and said elements whereby rocking movement of the shaft moves said elements in the opposite direction, and an actuating member mounted on the shaft and non-movable axially therewith and connected to the shaft to rock the same, substantially as and for the purpose set forth.

38. In a calculating machine, a frame, a carriage movable in reverse directions and comprising an axially movable rock shaft extending in the direction of movement of the carriage and guided in the frame, the shaft being movable about its axis relatively to the remaining portion of the carriage, and a series of elements supported concentric with the shaft and movable about the same independently thereof in one direction, a portion of the carriage being suspended from the shaft and movable axially therewith and fixed from rocking movement with the shaft, and means for limiting said elements in their movement in one direction, said means being carried by the depending portion of the carriage, substantially as and for the purpose described.

39. In a calculating machine, a frame, a carriage movable in reverse directions and comprising an axially movable rock shaft extending in the direction of movement of the carriage and guided in the frame, the shaft being movable about its axis relatively to the remaining portion of the carriage, a series of elements supported concentric with the shaft and movable about the same independently thereof in one direction, a portion of the carriage being suspended from the shaft and movable axially therewith and fixed from rocking movement with the shaft, means for limiting said elements in their movement in one direction, said means being carried by the depending portion of the carriage, and means for returning the elements from their numerical positions, the last-mentioned means being connected to the shaft to partake of the rocking movement thereof, substantially as and for the purpose specified.

40. In a calculating machine, a carriage movable in reverse directions and comprising a shaft extending in the direction of movement of the carriage and a supporting member loosely mounted on the shaft and including sides arranged at an angle to the shaft and an intermediate portion spaced apart from the shaft, said shaft being movable about its axis relatively to the supporting member, a series of elements arranged concentric with the shaft between the sides of the supporting member and movable into numerical positions, and means carried by the intermediate portion of the supporting member for determining the numerical positions of said elements, substantially as and for the purpose set forth.

41. In a calculating machine, a carriage movable in reverse directions and comprising a shaft and a supporting member, a series of elements mounted on the carriage concentric with the shaft, and a plurality of series of abutments guided in the supporting member and movable independently of each other into operative position, one series of abutments for each element, each series of the abutments being disposed in an arc substantially concentric with the axis of the shaft, and each of said elements being movable about the axis of the shaft into position to coöperate with one of the abutments and thereby assume a numerical position, substantially as and for the purpose described.

42. In a calculating machine, a carriage movable in reverse directions and comprising a shaft extending in the direction of movement of the carriage and a supporting member, a series of elements mounted on the carriage concentric with the shaft and shiftable axially into denominational positions by the movement of the carriage, a plurality of series of abutments guided in the supporting member and movable independently of each other into operative position, one series of abutments for each element, each series of the abutments being disposed in an arc substantially concentric with the axis of the shaft, and each of said elements being movable about the axis of the shaft into position to coöperate with one of the abutments and thereby assume a numerical position, means fixed from movement with the carriage for normally holding the elements from movement into numerical positions, and means for shifting the carriage and releasing the elements successively from the holding means, substantially as and for the purpose specified.

43. In a calculating machine, a carriage movable in reverse directions, a series of elements mounted on the carriage and movable into numerical positions, a plurality of series of abutments supported by the carriage and movable independently of each other into position to determine the numerical positions of said elements, a spring for forcing the carriage in one direction, an escapement for controlling the movement of the carriage by the spring, and means for forcing the abutments into their operative position, said means being connected to the escapement for actuating the same, substantially as and for the purpose set forth.

44. In a calculating machine, a carriage movable in reverse directions and comprising a shaft extending in the direction of movement of the carriage and having movement relatively to a portion of the carriage, a series of elements mounted on the carriage concentric with the shaft and movable individually about the axis of the shaft into numerical positions, means for moving the carriage in one of said directions, means for moving the carriage in the other of said directions, and means movable with the shaft relatively to said portion of the carriage for returning the elements from their numerical positions and for actuating the means for moving the carriage in one of said directions, substantially as and for the purpose described.

45. In a calculating machine, a frame, a carriage movable in reverse directions and comprising a shaft extending in the direction of movement of the carriage and guided in the frame, the shaft being also movable about its axis, a series of elements mounted on the carriage concentric with the shaft and movable individually about the axis of the shaft into numerical positions, means fixed from movement with the carriage for normally holding the elements from movement about the axis of the shaft, the movement of the carriage in one of said directions serving to release the elements successively from the holding means, means for moving the carriage in one of said directions, means for moving the carriage in the other of said directions, and means movable with the shaft about the axis thereof for returning the elements from their numerical positions and for actuating the means for moving the carriage in one of said directions, substantially as and for the purpose specified.

46. In a calculating machine, a carriage movable in reverse directions and comprising a shaft extending in the direction of movement of the carriage and having movement relatively to a portion of the carriage, a series of elements mounted on the carriage concentric with the shaft, a plurality of series of abutments guided in the carriage and movable independently of each other into operative position, one series of abutments for each element, each of said elements being movable about the axis of the shaft into position to coöperate with one of the abutments and thereby assume a numerical position, means for moving the carriage in reverse directions and controlling the movement thereof, and for moving the abutments into operative position, and means movable with the shaft relatively to said portion of the carriage for returning the elements and the abutments and for controlling the movement of the carriage, substantially as and for the purpose set forth.

47. In a calculating machine, a carriage movable in reverse directions and comprising a rock shaft extending in the direction of movement of the carriage and having movement about its axis relatively to a portion of the carriage, a series of elements mounted on the carriage concentric with the rock shaft and movable individually about the axis of the rock shaft into numerical positions, a spring connected to the carriage for moving the same in one of said directions, a movable member connected to the carriage for moving the same in the other of said directions, an arm carried by the rock shaft for returning the elements from their numerical positions, and a second arm connected to the rock shaft for actuating said movable member to move the carriage, substantially as and for the purpose described.

48. In a calculating machine, a carriage movable in reverse directions and comprising a rock shaft extending in the direction of movement of the carriage and having movement about its axis relatively to a portion of the carriage, a series of elements mounted on the carriage concentric with the rock shaft and movable individually about the axis of the rock shaft into numerical positions, detachably engaging driving and driven parts, the driven part being movable with the carriage, a spring for moving the driving part in one direction to actuate the driven part, the driving part having movement independently of the driven part when the spring is being tensioned, independently movable members connected respectively to the spring and the driven part, one movable member serving to tension the spring and the other serving to return the carriage, an arm carried by the shaft for returning the elements from their numerical positions, and additional means carried by the shaft for actuating said movable members, substantially as and for the purpose specified.

49. In a calculating machine, a carriage movable in reverse directions and comprising a rock shaft extending in the direction of movement of the carriage and having movement about its axis relatively to a portion of the carriage, a series of elements mounted on the carriage concentric with the rock shaft, a plurality of series of abutments guided in the carriage and movable independently into operative position, one series of abutments for each element, each of said elements being movable about the axis of the rock shaft to coöperate with one of the abutments and thereby assume a numerical position, a spring connected to the carriage for moving the same in one of said directions, a movable member connected to the carriage for moving the same in the other of said directions, and means carried by the rock shaft for moving the abutments from their operative position, for returning the elements from their numerical positions and for actuating said movable member to move the carriage, substantially as and for the purpose set forth.

50. In a calculating machine, a carriage movable in reverse directions and comprising a rock shaft extending in the direction of movement of the carriage and having movement about its axis relatively to a portion of the carriage, a series of elements mounted on the carriage concentric with the rock shaft, a plurality of series of abutments guided in the carriage and movable independently into operative position, one series of abutments for each element, each of said elements being movable about the axis of the rock shaft to coöperate with one of the abutments and thereby assume a numerical position, detachably engaging driving and driven parts, the driven part being movable with the carriage, a spring for moving the driving part in one direction to actuate the driven part, the driving part having movement independently of the driven part when the spring is being tensioned, independently movable members connected respectively to the spring and the driven part, one movable member serving to tension the spring and the other serving to return the carriage, an arm carried by the shaft for returning the elements from their numerical positions and for also moving the abutments from their operative position, and additional means operated by the shaft for actuating said movable members, substantially as and for the purpose described.

51. In a calculating machine, an axially movable rock shaft, a series of elements carried by the shaft concentric therewith and movable individually about the axis of the shaft into numerical positions, means for holding said elements from movement about the axis of the shaft, means for effecting the release of the elements from the holding means, means for determining the numerical positions of the released elements, engaging means movable with the rock shaft for returning the elements from their numerical positions, and an actuating part for the shaft arranged concentric with the shaft, substantially as and for the purpose specified.

52. In a calculating machine, an axially movable rock shaft, a series of elements carried by the rock shaft concentric therewith and movable axially with the rock shaft, engaging means associated with the rock shaft for moving said elements about the axis of the rock shaft in one direction, and means for rocking said shaft, said means being non-movable axially with the shaft, substantially as and for the purpose set forth.

53. In a calculating machine, an axially movable rock shaft, a series of elements carried by the rock shaft concentric therewith and movable axially with the rock shaft, engaging means associated with the rock shaft for moving said elements about the axis of the rock shaft in one direction, and means for rocking said shaft comprising a sleeve encircling the shaft and non-movable axially therewith and an operating part connected to the sleeve, substantially as and for the purpose described.

54. In a calculating machine, an axially movable rock shaft, a series of elements carried by the rock shaft concentric therewtih and movable axially with the rock shaft, engaging means associated with the rock shaft for moving said elements about the axis of the rock shaft in one direction, and means for rocking said shaft comprising a sleeve encircling the shaft and non-movable axially therewith, and an operating part mounted on the sleeve, substantially as and for the purpose specified.

55. In a calculating machine, an axially movable rock shaft, a series of elements carried by the rock shaft concentric therewith and movable individually about the axis of the shaft into numerical positions, means for holding said elements from movement into numerical positions, means for controlling the release of the elements from the holding means, means for determining the numerical positions of the released elements, engaging means movable with the rock shaft for returning the elements from their numerical positions, and means for rocking said shaft comprising a sleeve mounted on the shaft and non-movable axially therewith, and an operating part connected to the sleeve, substantially as and for the purpose set forth.

56. In a calculating machine, a rock shaft movable axially in reverse directions, a series of elements carried by the shaft concentric therewith and movable axially therewith and individually about the axis of the shaft into numerical positions, means for holding said elements from movement about the axis of the shaft, means for controlling the axial movement of the rock shaft in one direction and thereby effecting the release of the elements from the holding means, engaging means movable with the shaft for returning the elements from their numerical positions, a spring acting on the rock shaft to shift the same axially in said direction and being acted upon in a reverse direction independently of the rock shaft for tensioning said spring, means for acting on the spring independently of the axial movement of the rock shaft for tensioning the spring, means for moving the shaft axially in the reverse direction independently of the spring, and an operating member for rocking the shaft and for actuating both of the two last-mentioned means, substantially as and for the purpose described.

In testimony whereof, I have hereunto signed my name in the presence of two attesting witnesses, at Syracuse, in the county of Onondaga, in the State of New York, this 28th day of May, 1910.

WILLIAM H. BROWN.

Witnesses:
S. DAVIS,
FREDERIC G. BODELL.